United States Patent
Miyano et al.

(10) Patent No.: US 11,922,677 B2
(45) Date of Patent: Mar. 5, 2024

(54) INFORMATION PROCESSING APPARATUS, INFORMATION PROCESSING METHOD, AND NON-TRANSITORY COMPUTER READABLE MEDIUM

(71) Applicant: NEC Corporation, Tokyo (JP)

(72) Inventors: Hiroyoshi Miyano, Tokyo (JP); Masato Toda, Tokyo (JP); Azusa Sawada, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 356 days.

(21) Appl. No.: 17/442,757

(22) PCT Filed: Mar. 27, 2019

(86) PCT No.: PCT/JP2019/013437
§ 371 (c)(1),
(2) Date: Sep. 24, 2021

(87) PCT Pub. No.: WO2020/194622
PCT Pub. Date: Oct. 1, 2020

(65) Prior Publication Data
US 2022/0189144 A1    Jun. 16, 2022

(51) Int. Cl.
*G06V 10/774* (2022.01)
*G06N 5/04* (2023.01)
*G06V 10/70* (2022.01)

(52) U.S. Cl.
CPC ............. *G06V 10/774* (2022.01); *G06N 5/04* (2013.01); *G06V 10/87* (2022.01)

(58) Field of Classification Search
CPC .............. G06F 18/214; G06T 7/90; G06T 2207/20081; G06V 10/776; G06V 10/993; G06V 10/56
See application file for complete search history.

(56) References Cited

U.S. PATENT DOCUMENTS

| 2012/0016816 A1 | 1/2012 | Yanase et al. |
| 2015/0120624 A1 | 4/2015 | Yokono et al. |

(Continued)

FOREIGN PATENT DOCUMENTS

| JP | 2012-022558 A | 2/2012 |
| JP | 2015-087903 A | 5/2015 |
| JP | 2018-173890 A | 11/2018 |

OTHER PUBLICATIONS

International Search Report for PCT Application No. PCT/JP2019/013437, dated Jul. 20, 2019.

(Continued)

*Primary Examiner* — Edward F Urban
*Assistant Examiner* — Wassim Mahrouka
(74) *Attorney, Agent, or Firm* — Sughrue Mion, PLLC

(57) ABSTRACT

An information processing apparatus (10) according to the present disclosure includes: an object recognition unit (11) that outputs, by using a first modal signal and a first modal recognition model corresponding to the first modal signal, an inference result regarding the first modal signal; a training data processing unit (12) that generates first modal training data regarding the first modal signal by using the inference result, and updates second modal training data regarding a second modal signal that is different from the first modal signal by using the first modal training data; and a recognition model update unit (13) that updates a second modal recognition model corresponding to the second modal signal by using the second modal training data.

9 Claims, 8 Drawing Sheets

(56) References Cited

U.S. PATENT DOCUMENTS

2018/0060702 A1     3/2018    Ma et al.
2019/0156203 A1*   5/2019    Kang ..................... G06N 3/08
2019/0354896 A1    11/2019   Kobayashi

OTHER PUBLICATIONS

Avital Oliver et al., "Realistic Evaluation of Deep Semi-Supervised Learning Algorithms", 32nd conference on Neural Information Processing Systems (NeurIPS 2018), Montréal, Canada, pp. 1-12.

* cited by examiner

INFORMATION PROCESSING APPARATUS, INFORMATION PROCESSING METHOD, AND NON-TRANSITORY COMPUTER READABLE MEDIUM

This application is a National Stage Entry of PCT/JP2019/013437 filed on Mar. 27, 2019, the contents of all of which are incorporated herein by reference, in their entirety.

TECHNICAL FIELD

The present disclosure relates to an information processing apparatus, an information processing method, and a program.

BACKGROUND ART

In the field of image recognition or image processing, a large number of techniques including deep learning have been proposed. By using the image recognition or the image processing, it is possible to recognize a person or an object from an image with a high accuracy or to restore an image with a higher accuracy. However, a method using deep learning requires a large amount of supervised learning data, because a large scale model (a network structure used in the deep learning) is used. In order to solve such a problem, Non Patent Literature 1 discloses a method called semi-supervised learning which performs image recognition using a smaller amount of supervised learning data than that used in the above method. A common technique called semi-supervised learning uses input signals from a particular single modal such as a visible image, and training data provided for some of these input signals. Semi-supervised learning is a method for repeatedly updating training data and a recognition model and acquiring the recognition model. The update of the recognition model may also be referred to as an update of a classifier.

CITATION LIST

Non Patent Literature

Non Patent Literature 1: Avital Oliver, Augustus Odena, Colin Raffel, Ekin D. Cubuk, and Ian J. Goodfellow "Realistic Evaluation of Deep Semi-Supervised Learning Algorithms" 32nd conference on Neural Information Processing Systems (NeurIPS 2018)

SUMMARY OF INVENTION

Technical Problem

However, common semi-supervised learning repeats updating of training data for only a specific single modal and updating of a recognition model for only a specific single modal. Therefore, performance of semi-supervised learning strongly depends on the initial training data or the recognition model obtained initially from a small number of training data. As a result, the final recognition model obtained as a result of performing semi-supervised learning has a problem that the recognition performance is unstable; that is, there is no robustness.

An object of the present disclosure is to provide an information processing apparatus, an information processing method, and a program that enable construction of a robust recognition model without depending on initial training data.

Solution to Problem

An information processing apparatus according to a first aspect of the present disclosure includes: object recognition means for outputting, by using a first modal signal and a first modal recognition model corresponding to the first modal signal, an inference result regarding the first modal signal; training data processing means for generating first modal training data regarding the first modal signal by using the inference result, and updating second modal training data regarding a second modal signal by using the first modal training data, the second modal signal being different from the first modal signal; and recognition model update means for updating a second modal recognition model corresponding to the second modal signal by using the second modal training data.

An information processing method according to a second aspect of the present disclosure includes: outputting, by using a first modal signal and a first modal recognition model corresponding to the first modal signal, an inference result regarding the first modal signal; generating first modal training data regarding the first modal signal by using the inference result; updating second modal training data regarding a second modal signal by using the first modal training data, the second modal signal being different from the first modal signal; and updating a second modal recognition model corresponding to the second modal signal by using the second modal training data.

A program according to a third aspect of the present disclosure causes a computer to: output, by using a first modal signal and a first modal recognition model corresponding to the first modal signal, an inference result regarding the first modal signal; generate first modal training data regarding the first modal signal by using the inference result; update second modal training data regarding a second modal signal by using the first modal training data, the second modal signal being different from the first modal signal; and update a second modal recognition model corresponding to the second modal signal by using the second modal training data.

Advantageous Effects of Invention

According to the present disclosure, it is possible to provide an information processing apparatus, an information processing method, and a program that enable construction of a robust recognition model without depending on initial training data.

DESCRIPTION OF EMBODIMENT

First Example Embodiment

Figure 1:
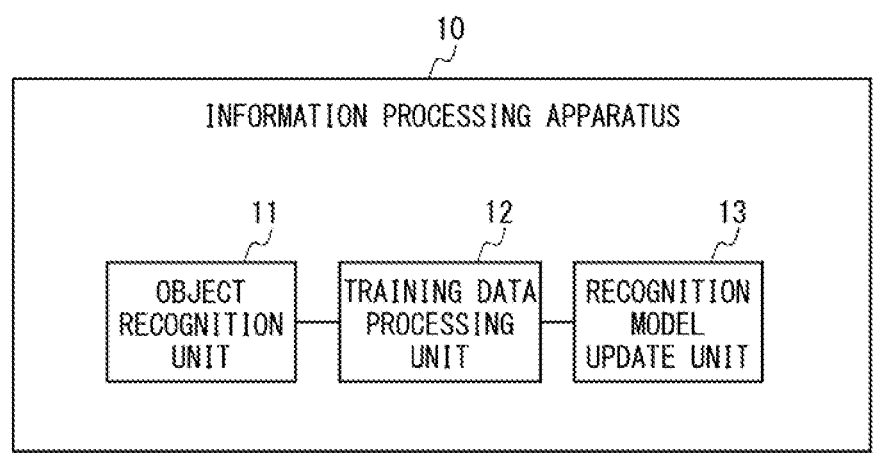
FIG. 1 is a configuration diagram of an information processing apparatus according to a first example embodiment.

Example embodiments according to the present disclosure will be described hereinafter with reference to the drawings. A configuration example of an information processing apparatus 10 according to a first example embodiment will be described with reference to FIG. 1. The information processing apparatus 10 may be a computer apparatus that operates by a processor executing a program stored in a memory.

The information processing apparatus 10 includes an object recognition unit 11, a training data processing unit 12, and a recognition model update unit 13. The object recognition unit 11, the training data processing unit 12, and the recognition model update unit 13 may be software or modules of which the processing is executed by a processor executing a program stored in a memory. Alternatively, the object recognition unit 11, the training data processing unit 12, and the recognition model update unit 13 may be hardware such as circuits or chips.

The object recognition unit 11 outputs, by using a first modal signal and a first modal recognition model corresponding to the first modal signal, an inference result regarding the first modal signal. The modals may be various types of sensors. The modal signal may be, for example, a signal including data obtained from the modal. The recognition model may be, for example, a model used to detect an object included in the data obtained from the modal. A detection result of an object using the recognition model may also be referred to as an inference result, a recognition result, or the like.

The training data processing unit 12 generates first modal training data regarding the first modal signal by using the inference result. Further, the training data processing unit 12 updates second modal training data regarding a second modal signal different from the first modal signal by using the first modal training data. The training data may also be referred to, for example, as correct answer data.

The recognition model update unit 13 updates a second modal recognition model corresponding to the second modal signal by using the second modal training data. The second modal recognition model may be a model used when an object is detected from data included in the second modal signal.

As described above, the information processing apparatus 10 can update, using a recognition result of one modal, training data of another modal. Thus, it is possible to update the training data using a larger amount of information than that used when only a recognition result of a single modal is used. Therefore, by using a plurality of pieces of modal information, it is possible to construct a more robust recognition model without depending on initial training data or the like.

Second Example Embodiment

Next, a configuration example of an information processing apparatus 100 according to a second example embodiment will be described with reference to FIG. 2. The information processing apparatus 100 corresponds to the information processing apparatus 10 shown in FIG. 1. The information processing apparatus 10 includes a plurality of modal signals input unit 101, a plurality of modal recognition models input unit 102, a processor 20, and a recognition model output unit 301. Communication interfaces or network interfaces may be used as the plurality of modal signals input unit 101, the plurality of modal recognition models input unit 102, and the recognition model output unit 301. Further, the respective elements constituting the information processing apparatus 100, for example, may be disposed in apparatuses different from each other and constitute an image processing system.

The processor 20 includes an object recognition unit 201, a training data generation unit 202, a training data propagation unit 203, a training data update unit 204, and a recognition model update unit 205. The object recognition unit 201, the training data generation unit 202, the training data propagation unit 203, the training data update unit 204, and the recognition model update unit 205 may be software or modules of which the processing is executed by the processor 20 executing a program stored in a memory. Alternatively, the object recognition unit 201, the training data generation unit 202, the training data propagation unit 203, the training data update unit 204, and the recognition model update unit 205 may be hardware such as circuits or chips.

The plurality of modal signals input unit 101 inputs, as a plurality of modal signals, two or more types of modal signals to the processor 20 and the plurality of modal recognition models input unit 102. The modal may be, for example, a visible sensor, a far-infrared sensor, a near-infrared sensor, a hyperspectral sensor, a multispectral sensor, a synthetic aperture radar or other radars, or a depth sensor. Alternatively, the modal may be voice data or text data. The text data may be data regarding natural language. Alternatively, the modal may be sensor data such as a weight sensor, a fiber sensor, and a vibration sensor. Alternatively, the modal may be an ultra-sensitive camera, a high-speed camera, or the like.

A plurality of modal signals may be a combination of signals obtained from a plurality of modals. For example, the plurality of modal signals may be a combination of a visible image and an image obtained from a synthetic aperture radar, a combination of a plurality of visible images having different polarizations, a combination of a visible image and a far-infrared image, or a combination of a plurality of images captured by different cameras. Alternatively, the plurality of modal signals may be a combination of a visible image and voice data, a combination of a visible image and weight data, a combination of a visible image and a vibration sensor, a combination of a visible image and text data, or a combination of a visible image and a depth sensor.

Alternatively, the plurality of modal signals may be, for example, one or more images captured using a video camera or a high-speed camera. Alternatively, the plurality of modal signals may be, for example, a series of images captured by changing the posture of a subject, such as a face, a person, or an object. Alternatively, the plurality of modal signals may be, for example, a series of image sequences of a subject, such as a face, a person, or an object, captured by changing the position of illumination or a camera. Alternatively, the plurality of modal signals may be multispectral or hyperspectral images obtained by capturing a subject, such as a face, a person, or an object, by using a plurality of spectral bands. That is, the plurality of modal signals may be images obtained by temporally or spatially changing a subject or a capturing environment based on a certain rule.

The plurality of modal recognition models input unit 102 receives the plurality of modal signals, and inputs a recognition model that outputs an inference result regarding one of these modal signals to the processor 20 as a plurality of modal recognition models. The recognition model may be, for example, a model for calculating a rectangle indicating an area of an object, mask information indicating an area of an object, a type of an object, or ID information of, for example, an individual or a person from the plurality of modal signals.

Alternatively, the recognition model may be a model for calculating ID information of an individual, a person, or the like and information about a type of an object or the like from voice data, text data, and sensor data of a weight sensor, a vibration sensor, or the like. Alternatively, the modal may be a model for calculating ID information of an individual, a person, or the like and information about a type of an object or the like from, for example, an ultra-sensitive camera or a high-speed camera.

That is, the plurality of modal recognition models input unit 102 outputs a recognition model for calculating, for example, a rectangle indicating an area of an object, mask information indicating an area of the object, a type of the object, ID information of an individual, a person, or the like from the signals input from the plurality of modal signals input unit 101.

The object recognition unit 201 selects one of the plurality of modal signals as a modal signal. Further, the object recognition unit 201 selects a modal recognition model corresponding to the selected modal signal among the plurality of modal recognition models. The object recognition unit 201 uses the selected modal signal as an input of the modal recognition model and outputs an inference result obtained from the modal recognition model as a modal recognition result. As the recognition model, for example, a common method for recognizing an object or detecting an object using deep learning such as Faster-RCNN (Regions with Convolutional Neural Networks), Mask-RCNN, or SSD (Single Shot Multibox Detector) may be used.

The training data generation unit 202 generates, by using the modal recognition result, modal training data corresponding to the modal signal selected by the object recognition unit 201. The modal recognition result includes rectangular information indicating an area of an object, label information indicating the area of the object, and the like.

Specifically, when the modal recognition result output from the object recognition unit 201 is rectangular information, mask information, or ID information, the training data generation unit 202 may use this rectangular information or the like as it is as new modal training data.

Alternatively, when the modal recognition result output by the object recognition unit 201 includes rectangular information and a degree of reliability of this rectangular information, the training data generation unit 202 may use only the rectangular information of which the degree of reliability is equal to or greater than a certain value as new modal training data.

Alternatively, the result output by the object recognition unit 201 may be rectangle information, mask information, or ID information. In this case, when the rectangular information and the like have already been given to the same area, the modal recognition result may not be reflected as training data.

Alternatively, the result output by the object recognition unit 201 may be rectangle information, mask information, or ID information, and a degree of reliability corresponding to this information. When the rectangle information and the like and the degrees of reliability have already been given to the same area, the training data generation unit 202 may generate the rectangle information and the like and their degrees of reliability as training data only when the degree of reliability corresponding to the modal recognition result is larger than the given degree of reliability.

The training data propagation unit 203 generates propagation modal training data in order to propagate the modal training data generated by the training data generation unit 202 as modal training data different from the modal signal selected by the object recognition unit 201.

In the following description, for the sake of convenience, it is assumed that the modal corresponding to the training data generated by the training data generation unit 202 is a visible image. The modal corresponding to the training data generated by the training data generation unit 202 is a modal that outputs the modal signal selected by the object recognition unit 201. Further, it is assumed that pieces of the training data generated by the training data generation unit 202 are rectangular information (e.g., a rectangle of an area including a vehicle) of a specific object, a mask image, and the degree of reliability thereof. Further, it is assumed that the modal to which the training data is propagated is a non-visible image (e.g., SAR (Synthetic Aperture Radar) image).

First, in a case in which a spatial correspondence relation between a visible image and a non-visible image is not established, the training data propagation unit 203 calculates the spatial correspondence relation between the visible image and the non-visible image. The case in which the spatial correspondence relation between the visible image and the non-visible image is established may be a case in which a space or an area displayed in the visible image substantially coincides with a space or an area displayed in the non-visible image. For example, in order to establish a correspondence relation between the visible image and the non-visible image, alignment between the images may be performed by using a Lucas Kanade method, a phase correlation limiting method, or the like and then a spatial correspondence relation between these images may be calculated for each pixel. Alternatively, a feature point based method such as SIFT (Scale Invariant Feature Transform) may be used to establish a correspondence relation between the visible image and the non-visible image. The training data propagation unit 203 may detect feature points from the visible image and the non-visible image by using SIFT, and perform matching between these feature points, thereby calculating a spatial correspondence relation between these images.

Next, the training data propagation unit 203 propagates rectangular information or mask image of a specific object in the visible image and its degree of reliability to the corresponding non-visible image. Propagating may also be referred to as applying, reflecting, transferring, or the like. Specifically, the training data propagation unit 203 may propagate the coordinates of the four vertices of the rectangle in the visible image to the coordinates of the four vertices of the corresponding non-visible image that has established the spatial correspondence relation with the visible image. Further, the training data propagation unit 203 may propagate the mask image in the visible image to the mask image in the corresponding non-visible image that has established the spatial correspondence relation with the visible image. Further, the training data propagation unit 203 may propagate the degrees of reliability of the rectangular information and the mask image by associating them with the corresponding coordinates of the four vertices and mask image in the non-visible image. Associating may also be referred to as making correspond, relating, or the like.

Alternatively, the training data propagation unit 203 may propagate the coordinates of the four vertices of the rectangle in the visible image to the coordinates of the four vertices of the corresponding non-visible image that has established the spatial correspondence relation with the visible image and a plurality of coordinates around these four vertices. Further, the training data propagation unit 203 may propagate the mask image in the visible image to the mask image in the corresponding non-visible image that has established the spatial correspondence relation with the visible image and its surrounding area. Further, the training data propagation unit 203 may propagate the degree of reliability of the rectangular information or the mask image by associating it with the corresponding coordinates of the four vertices and mask image in the non-visible image.

Further, the training data propagation unit 203 may propagate the rectangular information or the mask image of the specific object in the visible image and its degree of reliability to the non-visible image that has established the temporal correspondence relation with the visible image. The non-visible image that has established the temporal correspondence relation with the visible image may be a non-visible image captured or generated at substantially the same timing as that of the visible image.

The training data update unit 204 updates, by using propagation modal training data, training data of the modal signal corresponding to the propagation modal training data. Further, the training data update unit 204 generates the updated training data as update training data. The modal signal corresponding to the propagation modal training data is a modal signal output from a modal different from the modal selected by the object recognition unit 201.

More specifically, for example, when the propagation modal training data propagated from the training data propagation unit 203 is rectangular information, mask information, or ID information, the training data update unit 204 may use this rectangular information or the like as it is as the update training data. Alternatively, when the training data propagated from the training data propagation unit 203 is rectangle information and the degree of reliability of this rectangle information, the training data update unit 204 may use only the rectangle information of which the degree of reliability is equal to or greater than a certain value as the update training data. Alternatively, when the training data propagated from the training data propagation unit 203 is mask information and the degree of reliability of this mask information, the training data update unit 204 may use only the mask information of which the degree of reliability is equal to or greater than a certain value as the update training data.

The recognition model update unit 205 updates a recognition model of the modal signal corresponding to the update training data by using the update training data, thereby generating an update recognition model. For the sake of description, an example will be described in which the update training data updated by the training data update unit 204 is rectangular information in the SAR image and a recognition model to be updated is an object detection by Faster-RCNN. In this case, the recognition model update unit 205 may update the recognition model (i.e., a weight of a neural network) by using the update training data (i.e., the rectangular information in this case) updated by the training data update unit 204.

The recognition model output unit 301 outputs the update recognition model. For example, when the recognition model updated by the recognition model update unit 205 is a neural network, the recognition model output unit 301 may output a weight corresponding to the network structure.

Next, a configuration example of the information processing apparatus 100 including a first modal and a second modal as a plurality of modals will be described with reference to FIG. 3.

Figure 2:
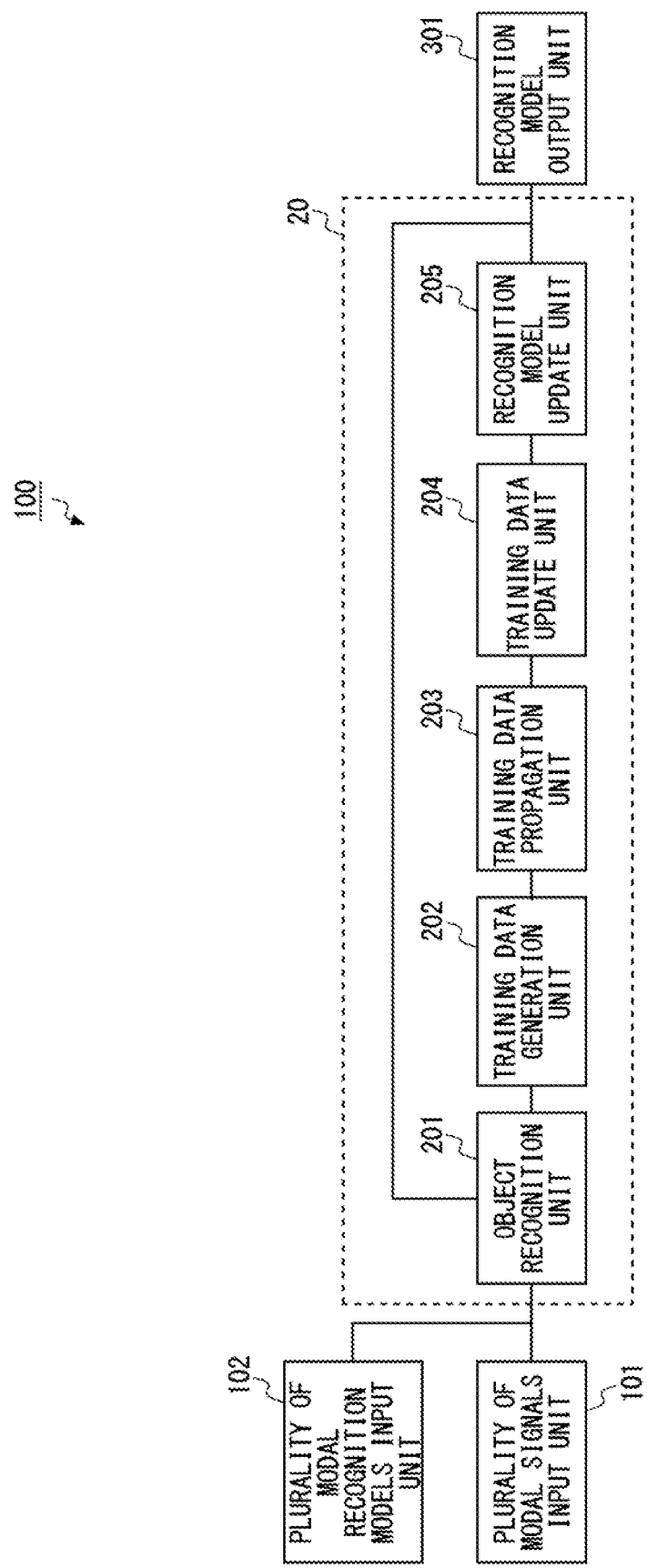
FIG. 2 is a configuration diagram of an information processing apparatus according to a second example embodiment.

The plurality of modal signals input unit 101 shown in FIG. 2 corresponds to a first modal signal input unit 101a and a second modal signal input unit 101b. The plurality of modal recognition models input unit 102 correspond to a first modal recognition model input unit 102a and a second modal recognition model input unit 102b. The object recognition unit 201 corresponds to a first modal object recognition unit 201a and a second modal object recognition unit 201b. The training data generation unit 202 corresponds to a first modal training data generation unit 202a and a first modal training data generation unit 202b. The training data propagation unit 203 corresponds to a second modal training data propagation unit 203a and a first modal training data propagation unit 203b. The training data update unit 204 corresponds to a second modal training data update unit 204a and a first modal training data update unit 204b. The recognition model update unit 205 corresponds to a second modal recognition model update unit 205a and a first modal recognition model update unit 205b. The recognition model output unit 301 corresponds to a first modal recognition model output unit 301a and a second modal recognition model output unit 301b.

Figure 3:
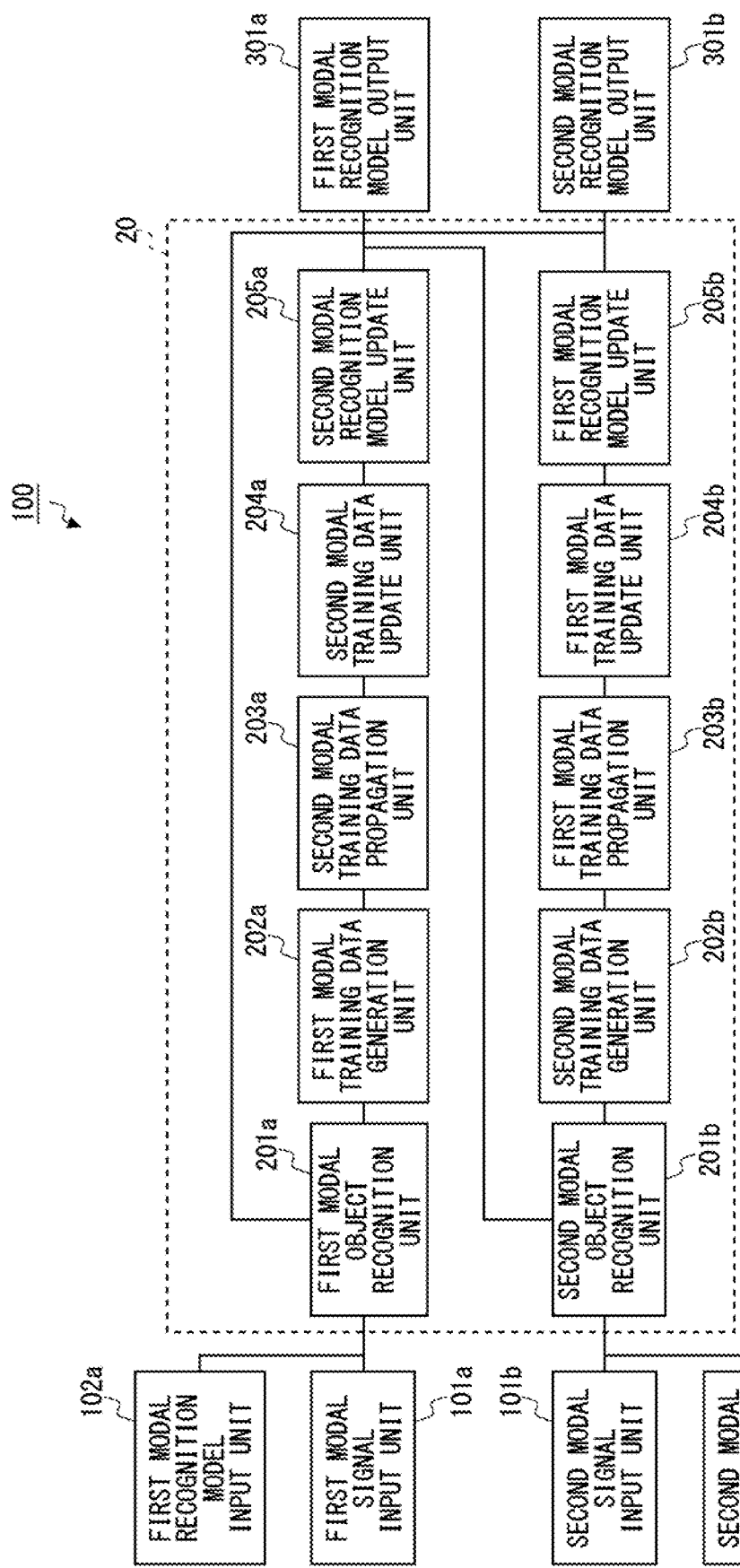
FIG. 3 is a configuration diagram of the information processing apparatus according to the second example embodiment.

In the information processing apparatus 100 shown in FIG. 3, the second modal recognition model update unit 205a updates a second modal recognition model based on a result recognized by the first modal recognition unit 201a. Further, the first modal recognition model update unit 205b updates a first modal recognition model based on this updated recognition model and a result recognized by the second modal recognition unit 201b. The information processing apparatus 100 shown in FIG. 3 is configured to repeat these processes.

Figure 4:
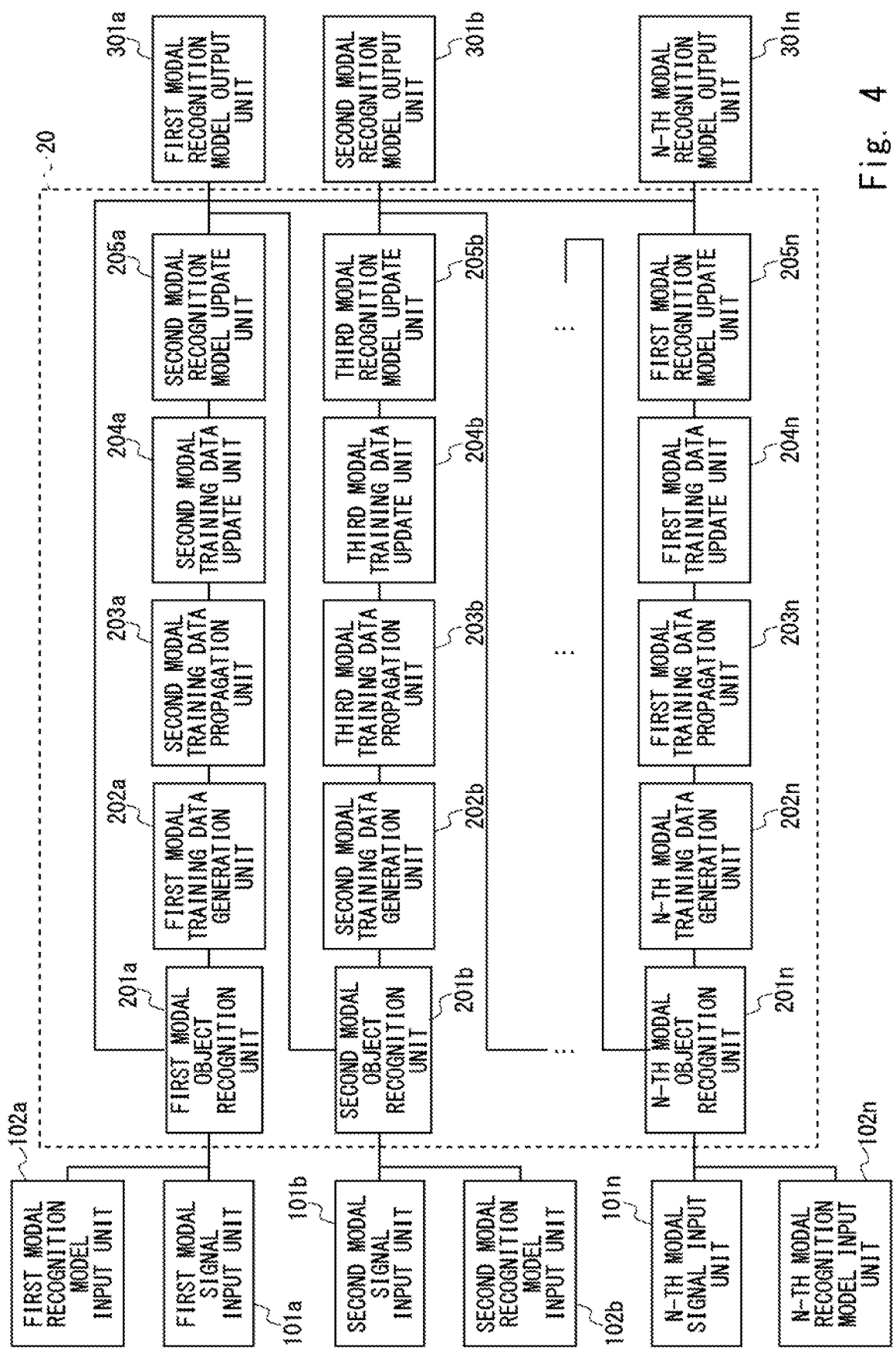
FIG. 4 is a configuration diagram of the information processing apparatus according to the second example embodiment.

Further, a case in which the first to N-th modals are used as the plurality of modals is described in FIG. 4. As shown in FIG. 4, the information processing apparatus 100 updates the recognition models in an order starting from the second modal recognition model to the N-th modal recognition model. Further, the information processing apparatus 100 updates a model of the first modal recognition model by using the recognition result of the N-th modal recognition model, and repeats these processes.

Figure 5:
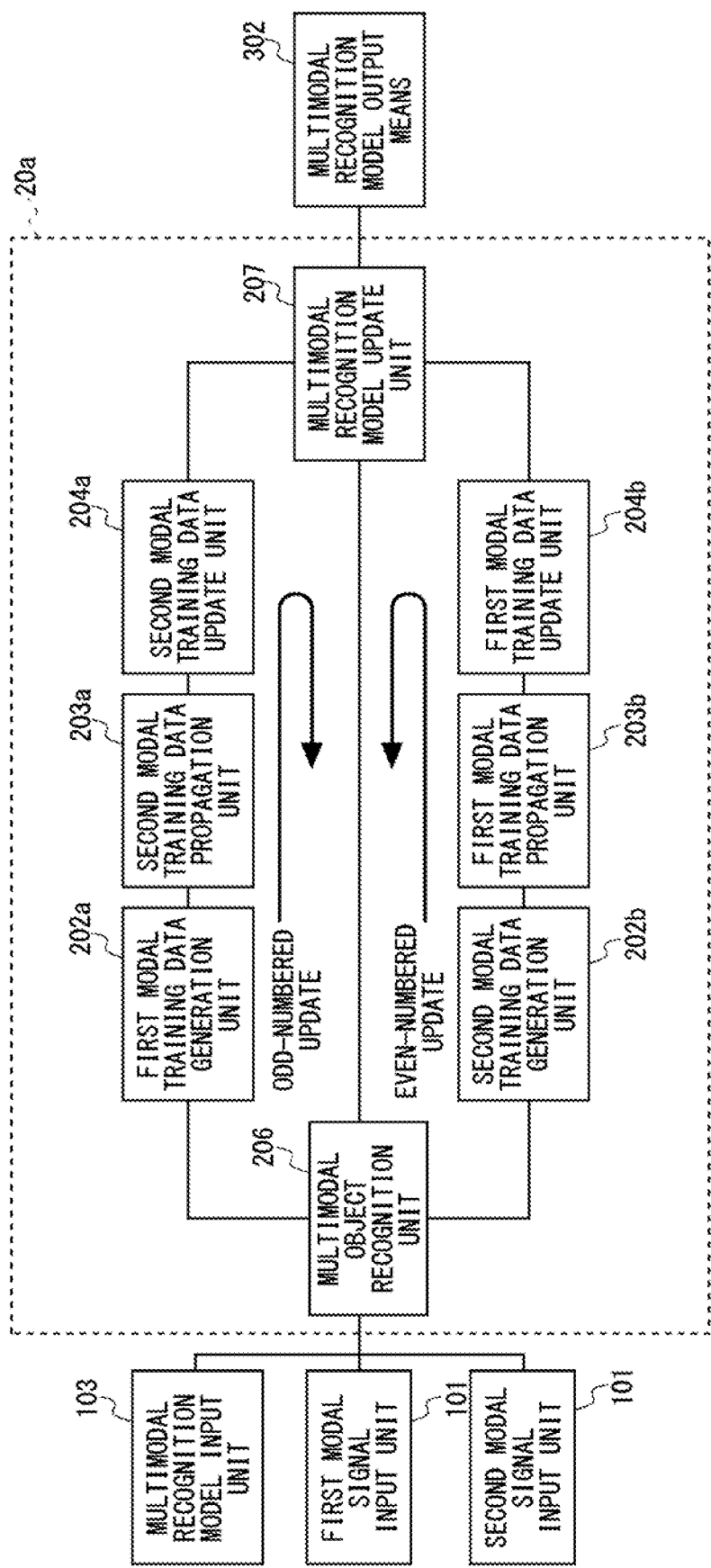
FIG. 5 is a configuration diagram of the information processing apparatus according to the second example embodiment.

Next, a modified example of the information processing apparatus 100 according to the second example embodiment will be described with reference to FIG. 5. A case in which a plurality of modals are composed of the first modal and the second modal is described in FIG. 5. Further, as shown in FIG. 5, a multimodal object recognition unit 206 performs object recognition by using the first and the second modals simultaneously instead of by using the first and the second modals separately. Then, as shown in FIG. 5, training data in the first modal and training data in the second modal are alternately propagated, whereby these pieces of training data are updated. Then, each time the training data of each modal is updated, a multimodal recognition model update unit 207 updates a multimodal recognition model.

That is, in FIG. 5, by using the plurality of modals, the generation of training data and the update of a recognition model are alternately and repeatedly performed. As a result, the information processing apparatus 100 shown in FIG. 5 implements image recognition with a higher efficiency than that when a single modal is used. Note that the recognition model performs recognition by using the multimodal signals simultaneously. As described above, the information processing apparatus 100 shown in FIG. 5 is effective also when recognition is performed by using the multimodal signals simultaneously.

Figure 6:
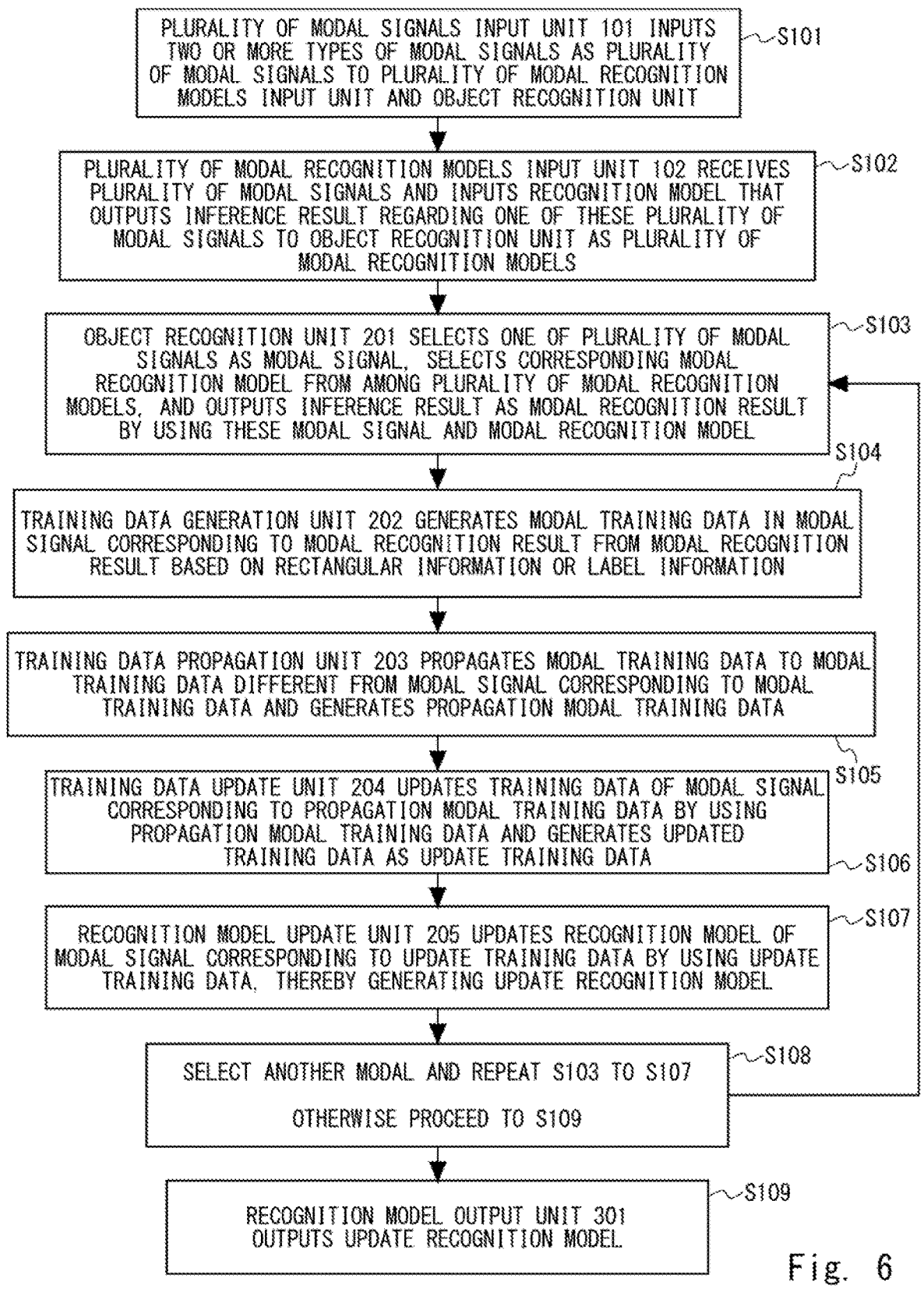
FIG. 6 is a diagram showing a flow of processing for updating a recognition model according to the second example embodiment.

Next, a flow of processing for updating a recognition model will be described with reference to FIG. 6. First, the plurality of modal signals input unit 101 inputs two or more types of modal signals as a plurality of modal signals to the plurality of modal recognition models input unit 102 and the object recognition unit 201 (S101).

Next, the plurality of modal recognition models input unit 102 receives the plurality of modal signals and inputs a recognition model that outputs an inference result regarding one of these plurality of modal signals to the object recognition unit 201 as a plurality of modal recognition models (S102).

Next, the object recognition unit 201 receives the plurality of modal signals and selects one of the plurality of modal signals as a modal signal. Further, the object recognition unit 201 receives the plurality of modal recognition models and selects a modal recognition model corresponding to the selected modal signal from among the plurality of modal recognition models. The object recognition unit 201 outputs the inference result as a modal recognition result by using the selected modal signal and modal recognition model (S103).

Next, the training data generation unit 202 generates modal training data in the modal signal corresponding to the modal recognition result based on rectangular information or label information included in the modal recognition result (S104).

Next, the training data propagation unit 203 propagates the modal training data to modal training data different from the modal signal corresponding to the modal training data and generates propagation modal training data (S105).

Next, the training data update unit 204 updates the training data of the modal signal corresponding to the propagation modal training data by using the propagation modal training data and generates the updated training data as update training data (S106).

Next, the recognition model update unit 205 updates the recognition model of the modal signal corresponding to the update training data by using the update training data, thereby generating an update recognition model (S107).

Next, the object recognition unit 201 selects another modal, and repeats the processes of S103 to S107 (S108). Further, when it is not necessary to repeat the processes of S103 to S107, such as when all the modals have been selected, the object recognition unit 201 proceeds to S109.

Lastly, the recognition model output unit 301 outputs the update recognition model (S109).

As described above, by using a plurality of pieces of modal information, the information processing apparatus 100 can update training data using a larger amount of information than that when only a single modal is used. Therefore, by using a plurality of pieces of modal information, the information processing apparatus 100 can construct a more robust recognition model without depending on initial training data or the like.

Here, as an example of the plurality of modals, a description will be given of a case in which a satellite image (hereinafter referred to as a visible satellite image) of a visible light band and a SAR image (a synthetic aperture radar image) are used. First, the object recognition unit 201 detects, by using a visible satellite image and an object recognition model for the visible satellite image, a vehicle in fine weather and in the daytime from the visible satellite image. Note that the object recognition model for the visible satellite image used herein is a model capable of detecting only a vehicle in fine weather and in the daytime.

Then, the training data generation unit 202 generates modal training data for the visible satellite image based on rectangular information or label information of the detected vehicle. Next, the training data propagation unit 203 propagates the training data to the SAR image that temporally and spatially corresponds to this visible satellite image. The training data update unit 204 updates the training data for the SAR image, thereby generating training data for the SAR image for detecting a vehicle. Next, the recognition model update unit 205 generates an object recognition model that detects a vehicle from the SAR image from the obtained training data for the SAR image.

Next, the object recognition unit 201 detects a vehicle with regard to a new SAR image by using the aforementioned object recognition model for the SAR image. Note that, for example, it is assumed that this new SAR image has been captured at night or in an environment in which fog or clouds are thick. In this case, although the vehicle can be clearly captured even in these environments in the SAR image, the vehicle cannot be clearly captured due to the night or the thick fog or clouds in the visible satellite image. Next, the training data generation unit 202 generates modal training data for the SAR image based on rectangular information and label information of the vehicle detected from the SAR image. Next, the training data propagation unit 203 propagates the training data to the visible satellite image that temporally and spatially corresponds to the SAR image. The training data update unit 204 updates training data for the visible satellite image, thereby generating new training data for the visible satellite image for detecting a vehicle. Next, the recognition model update unit 205 generates, that is, updates, an object recognition model that detects a vehicle from the visible satellite image from the obtained training data for the visible satellite image. The object recognition model for the visible satellite image obtained at this time can detect not only a vehicle in fine weather and the daytime, but also a vehicle even at night or when fog or clouds are present.

As described above, the initial object recognition model for the visible satellite image is a model capable of detecting only a vehicle in fine weather and the daytime. In contrast, the training data obtained by using a detection result of the SAR image is propagated and updated, whereby it is possible to detect not only a vehicle in fine weather and the daytime, but also a vehicle even at night or when fog or clouds are present. That is, by using a plurality of pieces of modal information, it is possible to construct a more robust recognition model without depending on initial training data or the like.

Figure 7:
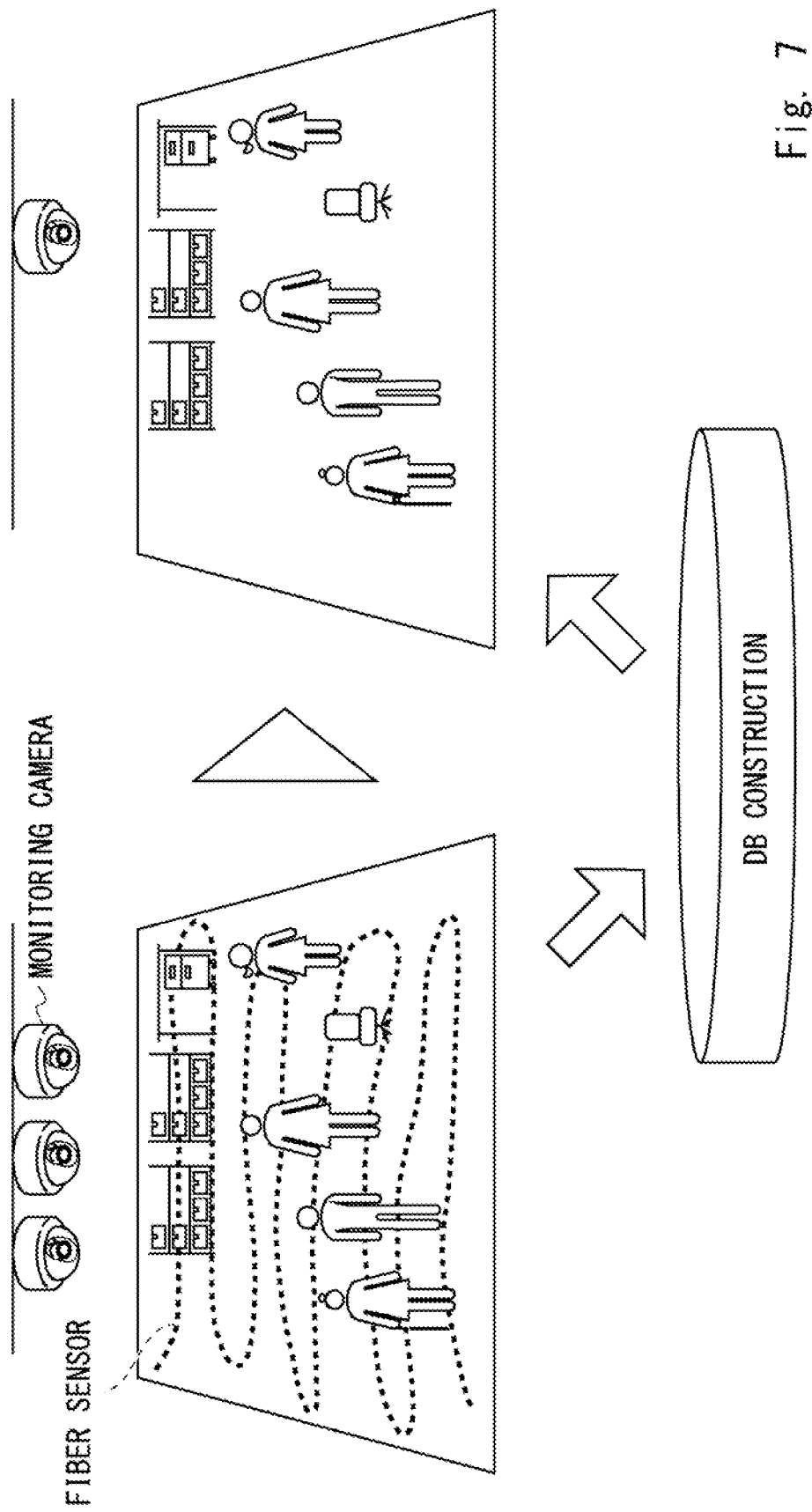
FIG. 7 is a diagram showing an effect when the information processing apparatus according to the second example embodiment is used.

Further, by using the information processing apparatus 100, it is possible, for example, as shown in FIG. 7, to accumulate various types of data and enhance the engine in a sensing-rich model environment, and construct an image processing system using a minimum sensing environment.

Figure 8:
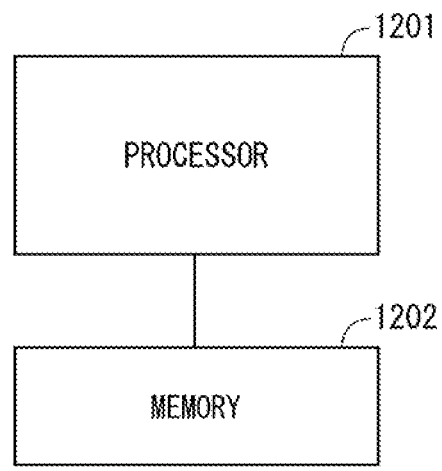
FIG. 8 is a configuration diagram of the information processing apparatus according to each of the example embodiments.

Note that each unit of the information processing apparatus or the image processing system may be implemented by using a combination of hardware and software. For example, FIG. 8 shows a configuration diagram regarding the information processing apparatus 10 and the information processing apparatus 100. In a form of the combination of hardware and software, an image processing program is developed in a memory 1202 such as a RAM (random access memory), and a processor 1201, which is hardware such as a control unit (CPU (central processing unit)), is operated based on the program, whereby each unit is implemented as various type of means. Further, the program may be recorded on a recording medium and then distributed. The program recorded on the recording medium is loaded into the memory by wire, wirelessly, or via recording medium itself to operate the control unit and the like. Note that examples of the recording medium include an optical disk, a magnetic disk, a semiconductor memory apparatus, and a hard disk.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, specific configurations of the present disclosure are not limited to the above-described example embodiments, and even when modifications are made without departing from the scope and spirit of the present disclosure, they are included in the present disclosure.

Although the present disclosure has been described with reference to the example embodiments, the present disclosure is not limited to the above-described example embodiments. Various modifications that may be understood by those skilled in the art may be made to the configurations and details of the present disclosure within the scope of the disclosure.

The whole or part of the example embodiments disclosed above can be described as, but not limited to, the following supplementary notes.

(Supplementary Note 1)

An information processing apparatus comprising:

object recognition means for outputting, by using a first modal signal and a first modal recognition model corresponding to the first modal signal, an inference result regarding the first modal signal;

training data processing means for generating first modal training data regarding the first modal signal by using the inference result, and updating second modal training data regarding a second modal signal by using the first modal training data, the second modal signal being different from the first modal signal; and recognition model update means for updating a second modal recognition model corresponding to the second modal signal by using the second modal training data.

(Supplementary Note 2)

The information processing apparatus according to Supplementary note 1, wherein the second modal signal is image data acquired at substantially the same time that the first modal signal is acquired, the image data indicating substantially the same space as that of the first modal signal.

(Supplementary Note 3)

The information processing apparatus according to Supplementary note 2, wherein the training data processing means is configured to generate area information indicating an area of a predetermined object included in the image data as the first modal training data, and uses the area information as the second modal training data.

(Supplementary Note 4)

The information processing apparatus according to Supplementary note 3, wherein the training data processing means is configured to output a degree of reliability of the area information together with the area information, and the training data processing means is configured to use the area information as the second modal training data when the degree of reliability exceeds a predetermined threshold.

(Supplementary Note 5)

The information processing apparatus according to Supplementary note 3 or 4, wherein the training data processing means is configured to comprise training data propagation means for propagating coordinates of four vertices of a rectangle indicated by rectangle information to the second modal training data, the rectangle information being the area information.

(Supplementary Note 6)

The information processing apparatus according to Supplementary note 3 or 4, wherein the training data processing means is configured to comprise training data propagation means for propagating a mask image to the second modal training data, the mask image being the area information.

(Supplementary Note 7)

The information processing apparatus according to any one of Supplementary notes 1 to 6, further comprising modal recognition model input means for selecting either the first modal signal or the second modal signal and inputting a modal recognition model corresponding to the selected modal signal to the object recognition means.

(Supplementary Note 8)

An information processing method comprising:

outputting, by using a first modal signal and a first modal recognition model corresponding to the first modal signal, an inference result regarding the first modal signal;

generating first modal training data regarding the first modal signal by using the inference result;

updating second modal training data regarding a second modal signal by using the first modal training data, the second modal signal being different from the first modal signal; and updating a second modal recognition model corresponding to the second modal signal by using the second modal training data.

(Supplementary Note 9)

A non-transitory computer readable medium storing a program for causing a computer to:

output, by using a first modal signal and a first modal recognition model corresponding to the first modal signal, an inference result regarding the first modal signal;

generate first modal training data regarding the first modal signal by using the inference result;

update second modal training data regarding a second modal signal by using the first modal training data, the second modal signal being different from the first modal signal; and update a second modal recognition model corresponding to the second modal signal by using the second modal training data.

REFERENCE SIGNS LIST

10 INFORMATION PROCESSING APPARATUS
11 OBJECT RECOGNITION UNIT
12 TRAINING DATA PROCESSING UNIT
13 RECOGNITION MODEL UPDATE UNIT
20 PROCESSOR
100 INFORMATION PROCESSING APPARATUS
101 PLURALITY OF MODAL SIGNALS INPUT UNIT
102 PLURALITY OF MODAL RECOGNITION MODELS INPUT UNIT
201 OBJECT RECOGNITION UNIT
202 TRAINING DATA GENERATION UNIT
203 TRAINING DATA PROPAGATION UNIT
204 TRAINING DATA UPDATE UNIT
205 RECOGNITION MODEL UPDATE UNIT
301 RECOGNITION MODEL OUTPUT UNIT

What is claimed is:

1. An information processing apparatus comprising:
at least one memory storing instructions, and
at least one processor configured to execute the instructions to;
output, by using a first modal signal and a first modal recognition model corresponding to the first modal signal, an inference result regarding the first modal signal;
generate first modal training data regarding the first modal signal by using the inference result, and updating second modal training data regarding a second modal signal by using the first modal training data, the second modal signal being different from the first modal signal; and
update a second modal recognition model corresponding to the second modal signal by using the second modal training data.

2. The information processing apparatus according to claim 1, wherein the second modal signal is image data acquired at substantially the same time that the first modal signal is acquired, the image data indicating substantially the same space as that of the first modal signal.

3. The information processing apparatus according to claim 2, wherein the at least one processor is further configured to execute the instructions to generate area information indicating an area of a predetermined object included in the image data as the first modal training data, and use the area information as the second modal training data.

4. The information processing apparatus according to claim 3, wherein the at least one processor is further configured to execute the instructions to
output a degree of reliability of the area information together with the area information, and
use the area information as the second modal training data when the degree of reliability exceeds a predetermined threshold.

5. The information processing apparatus according to claim 3, wherein the at least one processor is further configured to execute the instructions to propagate coordinates of four vertices of a rectangle indicated by rectangle information to the second modal training data, and the rectangle information is the area information.

6. The information processing apparatus according to claim 3, wherein the at least one processor is further configured to execute the instructions to propagate a mask image to the second modal training data, and the mask image is the area information.

7. The information processing apparatus according to claim 1, wherein the at least one processor is further configured to execute the instructions to select either the first modal signal or the second modal signal and input a modal recognition model corresponding to the selected modal signal.

8. An information processing method comprising:
outputting, by using a first modal signal and a first modal recognition model corresponding to the first modal signal, an inference result regarding the first modal signal;
generating first modal training data regarding the first modal signal by using the inference result;
updating second modal training data regarding a second modal signal by using the first modal training data, the second modal signal being different from the first modal signal; and
updating a second modal recognition model corresponding to the second modal signal by using the second modal training data.

9. A non-transitory computer readable medium storing a program for causing a computer to:
output, by using a first modal signal and a first modal recognition model corresponding to the first modal signal, an inference result regarding the first modal signal;
generate first modal training data regarding the first modal signal by using the inference result;
update second modal training data regarding a second modal signal by using the first modal training data, the second modal signal being different from the first modal signal; and
update a second modal recognition model corresponding to the second modal signal by using the second modal training data.

* * * * *